US006843627B2

(12) United States Patent
Childs et al.

(10) Patent No.: US 6,843,627 B2
(45) Date of Patent: Jan. 18, 2005

(54) WRENCHLESS BLADE CLAMP ASSEMBLY

(75) Inventors: Daniel K. Childs, Forest Park, IL (US); Jan Peter Houben, Poppel (BE); Michael Holzer, Wauconda, IL (US); Leon Bujalski, Chicago, IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/317,977

(22) Filed: Dec. 12, 2002

(65) Prior Publication Data

US 2003/0136010 A1 Jul. 24, 2003

Related U.S. Application Data

(60) Provisional application No. 60/341,400, filed on Dec. 12, 2001.

(51) Int. Cl.[7] .......................... F16B 31/00; F16B 37/08

(52) U.S. Cl. .......................... 411/7; 411/408; 411/432; 411/919; 83/481

(58) Field of Search .............................. 411/61, 7, 402, 411/408, 432, 919; 83/481, 592

(56) References Cited

U.S. PATENT DOCUMENTS

| | | | | |
|---|---|---|---|---|
| 2,503,189 A | | 4/1950 | Biba, Jr. | |
| 3,411,396 A | | 11/1968 | Herpich | |
| 4,955,744 A | | 9/1990 | Barth et al. | |
| 5,161,334 A | | 11/1992 | Schaal et al. | |
| 5,199,223 A | | 4/1993 | Rudolf et al. | |
| 5,324,148 A | | 6/1994 | Notaro | |
| 5,395,196 A | | 3/1995 | Notaro | |
| 5,447,086 A | | 9/1995 | Wittmaier et al. | |
| 5,480,273 A | | 1/1996 | Jou | |
| 5,658,304 A | | 8/1997 | Lim | |
| 5,810,533 A | | 9/1998 | Nakamura | |
| 5,871,322 A | | 2/1999 | Nakamura | |
| 6,070,774 A | * | 6/2000 | Rak et al. | 411/7 X |
| 6,364,585 B1 | * | 4/2002 | Sakamoto | 411/7 |
| 6,364,688 B1 | * | 4/2002 | Fraley, II et al. | 411/7 X |

FOREIGN PATENT DOCUMENTS

| | | |
|---|---|---|
| CH | 449 931 A | 1/1968 |
| DE | 959 323 B | 3/1957 |

OTHER PUBLICATIONS

Niemann, "Maschinenelemente," vol. 1, p. 196, Springer–Verlag (Berlin), Heidelberg (New York) (1975).

* cited by examiner

*Primary Examiner*—Neill Wilson
(74) *Attorney, Agent, or Firm*—Gardner Carton & Douglas LLP

(57) ABSTRACT

A wrenchless clamp assembly is provided to secure a tool disc, such as a circular saw blade, to a shaft of a power tool. The blade clamp assembly includes an outer flange positionable against an outer side of the blade and a manually tightenable click bolt that includes a movable click member operable to selectively engage the outer flange for rotationally locking or unlocking the bolt. In an embodiment, the click member moves alternatingly between axially engaged and disengaged positions according to sequential rotational increments of the click member relative to the bolt body. Accordingly, the click bolt can be installed by hand and rotationally locked without a need for high torque, and the click bolt can be easily removed by hand when the click member is moved to the disengaged position, axially free from the outer flange. In an embodiment, the click bolt permits limited torque applied during installation.

42 Claims, 10 Drawing Sheets

WRENCHLESS BLADE CLAMP ASSEMBLY

This application claims benefit of 60/344,400 filed Dec. 12, 2001

FIELD OF THE INVENTION

The present invention generally relates to rotary power tools and more particularly to a wrenchless blade clamp assembly for securing a blade of a circular saw.

BACKGROUND OF THE INVENTION

A circular saw generally includes a circular blade having a centrally located hole for mounting the blade to a rotatable shaft. The blade is conventionally mounted to end of the rotatable shaft in compression between an inner flange and outer flange or washer, held by a conventional bolt threaded into a threaded bore in the shaft. In order to apply sufficient torque to the bolt for installing or removing the blade, a wrench must be used.

Inconveniences are incurred by the use of a conventional bolt to mount a circular saw blade. For example, the task of obtaining an appropriate wrench can be time consuming, and using the wrench can be cumbersome. It is, therefore, desirable to have a quicker and simpler way to manually secure a blade to the rotating shaft of a circular saw without the need for any extra tools.

It is desirable to provide a wrenchless blade clamp assembly that is convenient, avoids a need for tools, and has a simple structure. In particular, it is desirable to provide a blade clamp assembly that includes a click bolt, which can be tightened by hand, to secure the blade to the shaft. It is also desirable to provide a wrenchless blade clamp assembly, which can be retrofit for use with many conventional circular saws that utilize a conventional bolt to secure a blade to a shaft, particularly wherein the blade is form-fit in a rotational direction to the shaft.

SUMMARY OF THE INVENTION

The present invention provides a wrenchless clamp assembly for securing a tool disc to an end of a shaft of a rotary power tool. In particular, the present invention provides a wrenchless blade clamp assembly for mounting a circular blade to a shaft of a circular saw. In a particular embodiment, the blade clamp assembly generally includes a click bolt and a cooperative flange. The click bolt and flange are selectively interlockable to prevent rotation of the bolt when installed, yet to allow the bolt manually to be tightened and loosened as desired. As a result, the blade clamp assembly facilitates installation and removal of a blade from a circular saw without a need for tools. The blade clamp assembly advantageously avoids inadvertent loosening or overtightening.

In an embodiment, the click bolt is configured to selectively interlock with the flange. The click bolt includes a male threaded member and an axially movable click member that selectively permits the bolt to be rotationally locked or and unlocked relative to the flange.

For example, in an embodiment, the blade clamp assembly includes a click bolt and an outer flange positionable against an outer side of the blade. The click bolt has a unitary bolt body with a head and a threaded shank that axially projects from the head. The shank is configured to pass through a central aperture in the outer flange and to be received into a threaded axial bore to sufficient depth that the bolt head seats against the outer flange. The click bolt has a grippable click member rotationally mounted to the bolt head, so that when sufficient torque is applied to the click member (e.g., by the grip of a user turning the click bolt by hand), the click member incrementally rotates relative to the bolt head. Each incremental rotation of the click member results in corresponding axial displacement of the click member relative to the bolt head, alternating between: (a) a first axial position wherein the click member is axially spaced from the outer flange when the bolt head is seated on the flange; and (b) a second axial position wherein the click member engages the outer flange when the bolt head is seated on the flange. In an embodiment, as the click member is adjusted between the first and second axial positions, the click member can also assume a third axial position wherein the click member is spaced further front the outer flange than the first axial position. For example, the third axial position results from contact of the click member against a planar portion of a cam surface as the click member is moved between recesses in the cam surface that define the first and second axial positions.

In an embodiment, the click member and the flange are provided with cooperatively shaped locking detents. For example, in an embodiment, the click member and the flange include cooperatively shaped detents which engage in an interdigitated manner when the click member is in the second axial position. Preferably, the click member is generally ring-shaped and includes a plurality of the locking detents in a circular pattern. Moreover, the locking detents are preferably ramp shaped.

The click member rotates by an increment relative to the bolt head when the torque applied to the click member overcomes a rotational resistance. In an embodiment, to provide the rotational resistance, the click bolt includes a spring that urges the click member axially toward the second position, i.e., toward the outer flange member. Additionally, in an embodiment, the click bolt further includes a cam structure that results in the first or second axial positions depending on the increment of rotation of the click member relative to the bolt head.

In an embodiment, to install a blade on a circular saw, the blade is placed on the shaft against an inner flange, the outer flange is placed over the shaft against an outer side of the blade, and the click bolt is inserted into the threaded bore in the shaft. The user manually rotates the bolt by gripping and applying torque to the click member. As a result of the spring and cam structure, the click member shifts or "clicks" to a next rotational increment when the bolt is fully tightened onto the shaft. Accordingly, when the bolt is threaded to a depth wherein the bolt head firmly seats against the outer flange, the click member shifts to a next rotational position and moves to the second axial position, wherein the interdigitated locking detents prevent the bolt from rotating relative to the outer flange. The spring urges the click member in the direction of the blade, thereby holding the outer flange against the blade. In order to remove the blade, the user again applies torque to the click member (in the same rotational direction used during installation) until the click member shifts to a next rotational increment and to the first axial position. In the first axial position, the locking detents of the click member are free from the outer flange, permitting the bolt to be rotated for removal from the shaft.

In an embodiment, the shank of the click bolt has reverse threads, so that the click bolt is tightened by counterclockwise rotation in the threaded bore in the shaft. Moreover, in an embodiment, the blade clamp assembly has compact dimensions and a low profile to minimize interfering contact with a workpiece. Such a feature is especially advantageous for saws capable of making bevel cuts, in that the compact and low profile shape helps the clamp assembly to avoid inadvertent contact with nearby structures that could otherwise knock the bolt to an overtightened state.

In an embodiment, the click bolt permits a limited amount of torque when rotated in an installation direction. For example the click bolt may include a ratchet mechanism that permits the click member to rotate relative to the click bolt when torque is applied in excess of a predetermined amount. In an embodiment, the ratchet mechanism permits one-way rotation so that the click member can deliver a greater amount of torque to the bolt body when rotated in a removal direction. Advantageously, the click bolt avoids overtightening, therefore permitting hand removal.

An advantage of the present invention is to provide an improved blade clamp assembly. Another advantage of the present invention is to provide a blade clamp assembly which can be manually tightened and/or loosened, avoiding a need for a tool.

A further advantage of the present invention is to provide an improved blade clamp assembly which maintains an optimal clamping force against a saw blade and which prevents overtightening of the bolt during installation of a blade.

Still another advantage of the present invention is to provide a blade clamp assembly which prevents the click bolt from becoming overtightened, thereby permitting the bolt to be removed manually later.

A still further advantage of the present invention is to provide a blade clamp assembly which minimizes the time and inconvenience of installing, removing and/or interchanging a blade of a circular saw.

The wrenchless blade clamp assembly includes operative components which, in an embodiment, are advantageously located on an outer side of a saw blade or tool disc, yet which have a low profile to avoid interference with a workpiece.

Other advantages of the present invention will be apparent from the following detailed description with reference to the accompanying drawings.

DESCRIPTION OF THE PRESENTLY PREFERRED EMBODIMENTS

Figure 1:
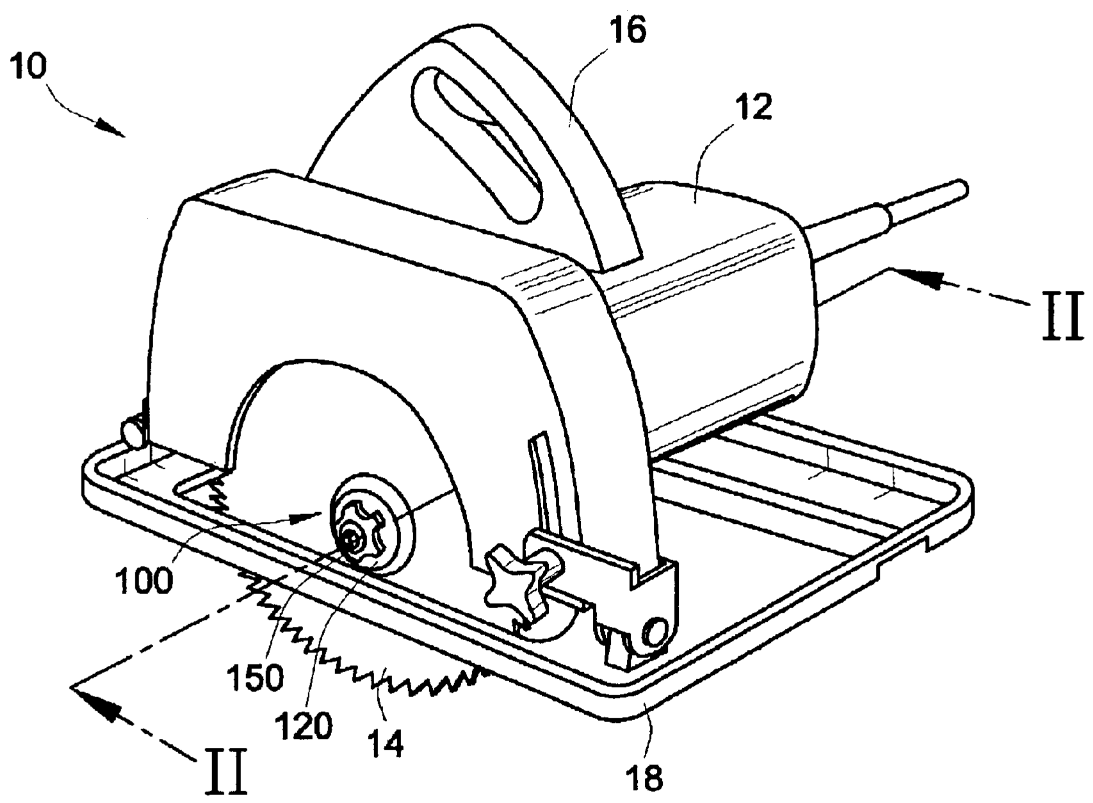
FIG. 1 is a perspective view of a circular saw including an exemplary wrenchless blade clamp assembly having features according to teachings of the present invention.

Now referring to the drawings, wherein like numerals designate like components, FIG. 1 illustrates a circular saw 10. The saw 10 includes a housing 12 and a circular blade 14 rotationally driven, through a gear reduction, by a motor within the housing. In the illustrated embodiment, the housing 12 is shaped to include a handle portion 16 to be gripped by a user, with a switch mounted to the handle portion for actuating the motor. The saw 10 also includes a foot plate 18 to support the saw 10 against a work piece during use.

Figure 2:
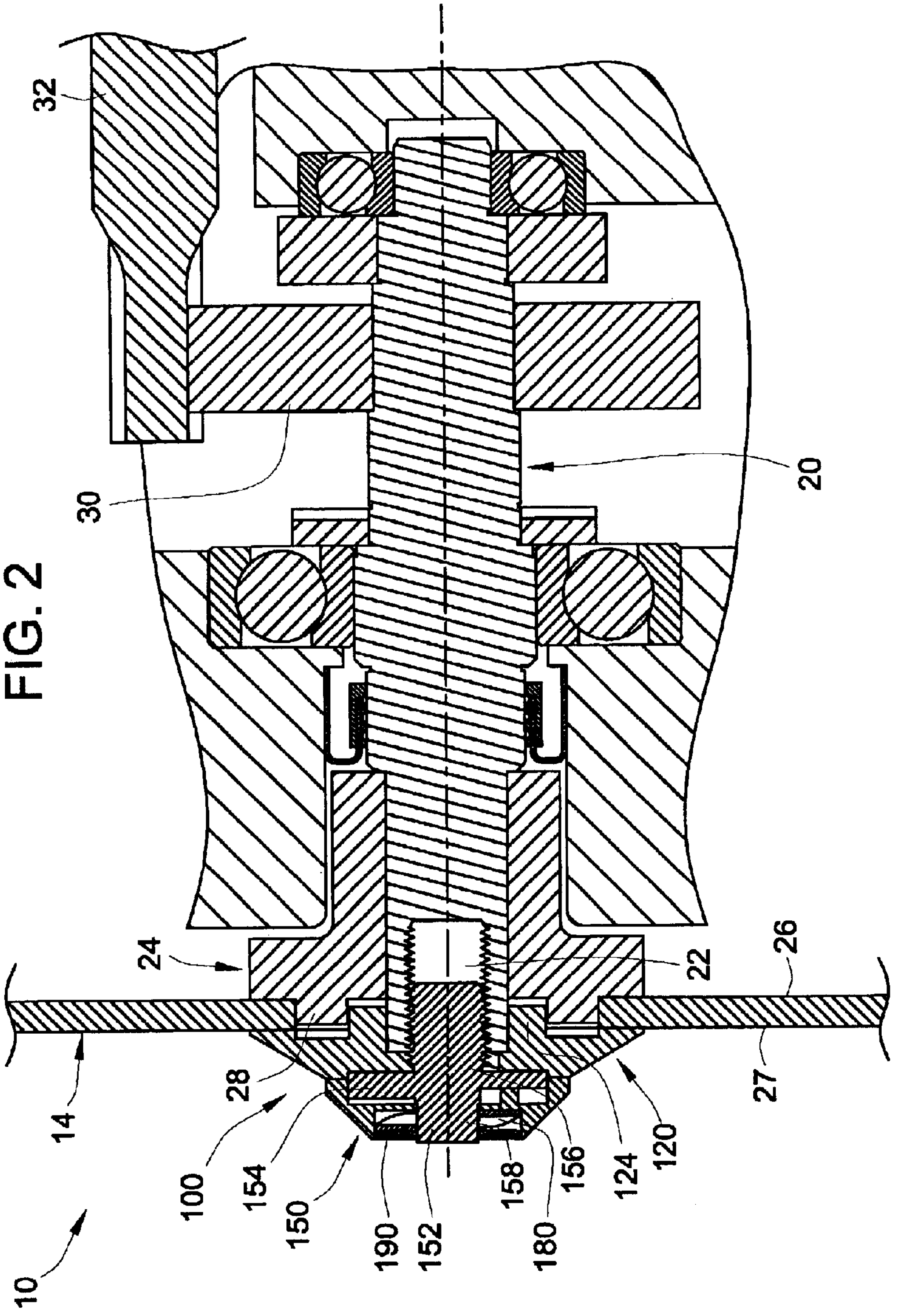
FIG. 2 is a sectional view as taken generally along line II—II of FIG. 1.

Referring to FIG. 2, the saw 10 includes a shaft 20 that is rotationally driven by the motor (not shown) through a gear 30 and spindle 32. The shaft 20 includes an axially oriented bore 22 that opens at a mounting end of the shaft. The bore 22 has internal threads. The saw 10 further includes an inner flange 24 that is mounted to the shaft 20 at an inner side of the blade 14. In order to rotationally fix the inner flange 24 to the shaft 20, the shaft is form fit through the inner flange 24. For example, the shaft preferably has a non-circular cross section (e.g., square or having at least one flat side or groove), and the shaft extends through a cooperatively shaped hole through the inner flange 24. The fit of the shaft 20 within the cooperatively shaped hole in the inner flange 24 is effective to transmit torque.

The blade 14 is form fit to the inner flange. Still referring to FIG. 2, the blade 14 has an inner side 26 that is positioned against the inner flange 24. Also, the inner flange 24 includes a projection 28 that extends in an outward direction and is received in a cooperatively shaped hole in the blade 14. The projection 28 has a non-circular cross-section so that the inner flange 24 transmits torque to the blade 14, so that the blade is rotationally fixed to the inner flange with minimal play.

Figure 3:
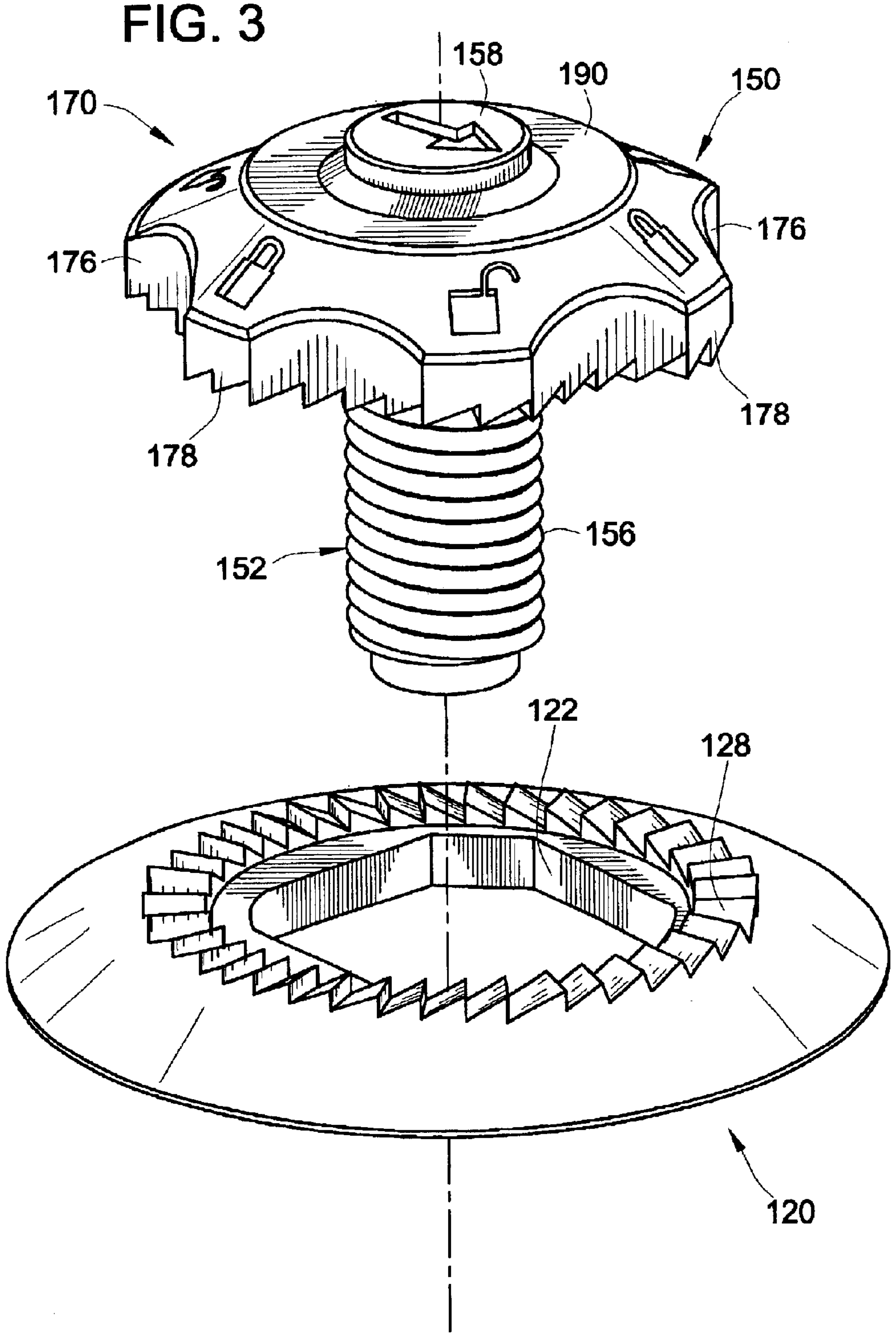
FIG. 3 is a perspective view of the click bolt and outer flange of the exemplary wrenchless blade clamp assembly.

In order to securely mount a tool disc to a rotary shaft, a wrenchless blade clamp assembly is provided. For example, as illustrated in FIG. 3, a wrenchless blade clamp assembly includes an outer flange 120 and a click bolt 150. The outer flange 120 is generally disc-shaped, the outer flange having a central aperture 122 to receive the shaft 20 of the saw 10. The outer flange is illustrated in FIGS. 1–3, 6*a* and 6*b*, and the click bolt is illustrated in FIGS. 1–4, 5*a*, 5*b*, 6*a* and 6*b*.

Turning back to FIG. 2, the outer flange 120 fits centrally against an outer side 27 of the blade 14. In an embodiment, a central portion of the outer flange 120 includes a hub 124 that projects in an inward direction and is cooperatively received in an interlocking fashion between the shaft 20 and the outwardly directed projection 28 of the inner flange 24. As a result, the outer flange 120 is preferably rotationally fixed with respect to the shaft 20 and the inner flange 24. The click bolt 150 is mounted to hold the outer flange 120 securely against the blade 14, which in turn is held securely against the inner flange 24. Advantageously, the clamp assembly 100 has a low profile and compact envelope on the outer side 27 of the blade 14, minimizing to avoid inadvertent contact of the clamp assembly 100 against objects during use, such as when the saw is adjusted for a bevel cut.

Figure 4:
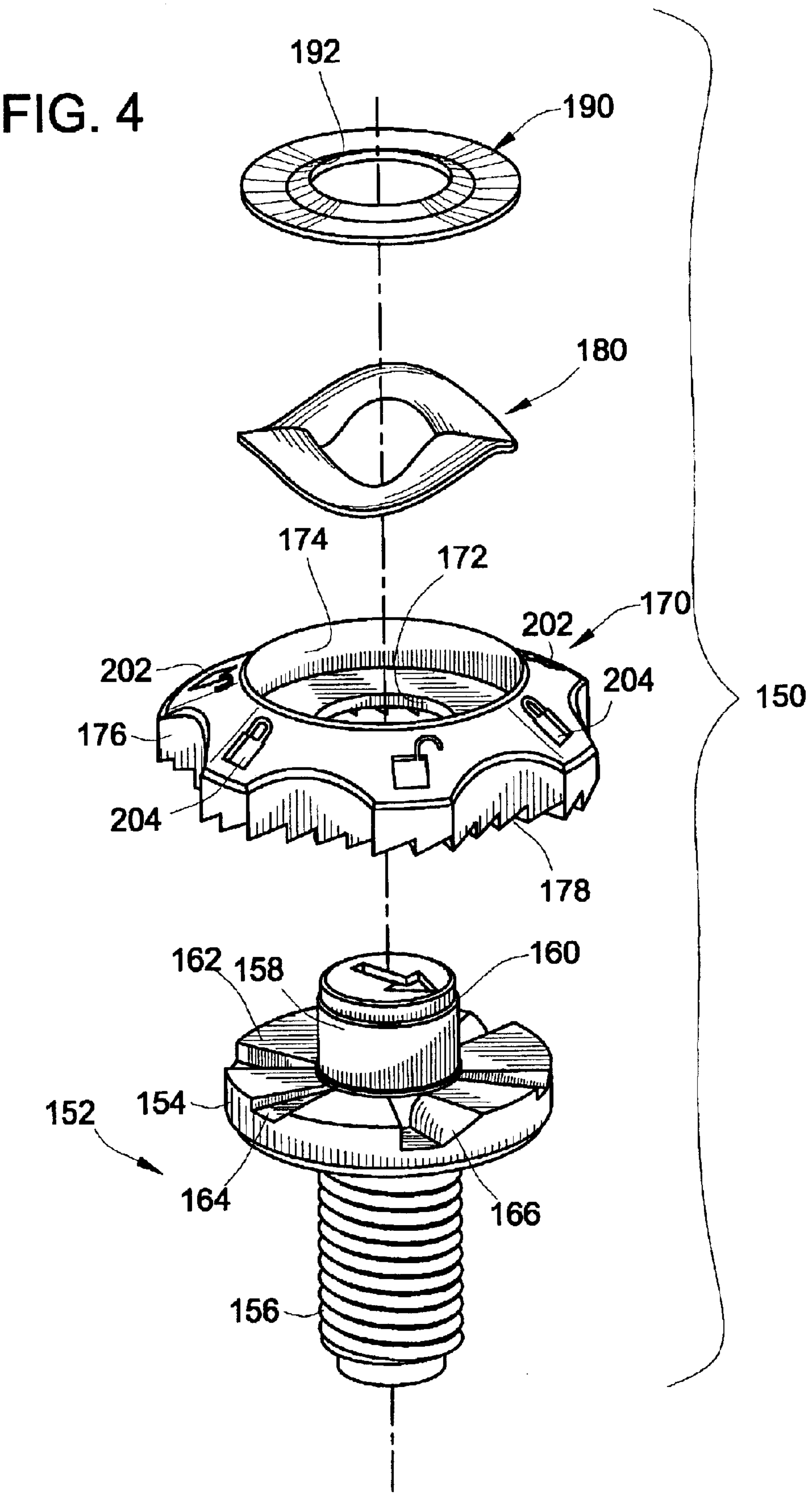
FIG. 4 is an exploded view of the click bolt.

The click bolt is illustrated in FIGS. 1–4, 5*a*, 5*b*, 6*a* and 6*b*. With reference to FIG. 4, the click bolt 150 includes a unitary bolt body 152 that has a bolt head 154 and a threaded shank 156 which extends axially from the head. The threaded shank 156 is configured to have external threads to be matably received by the internal threads of bore 22 in the shaft, shown in FIG. 2. Preferably, in an embodiment wherein the blade 14 is driven in a clockwise direction (as viewed from the outer side 30 of the blade 14) during operation of the saw 10, threads on the bore 22 and shank 156 have a non-standard or reverse orientation so that the bolt 150 is turned counterclockwise (as viewed from the outer side 27 of the blade 14) to penetrate the shank deeper into the bore. Accordingly, the bolt 150 must be rotated clockwise to remove the shank 156 from the bore 22. It will be recognized that the saw 10 illustrated in FIG. 1 is configured for right-hand use, and that another embodiment, which is a mirror image, is possible with the blade being positioned on the opposite side and rotating in a counter-clockwise direction as viewed from the outer side of the blade. Those skilled in the art will appreciate that, for use with such embodiment, the clamp assembly would be provided in a mirror image as well to have corresponding opposite directional action.

According to an aspect of the present invention, the wrenchless blade clamp assembly provides for selective engagement and disengagement of a portion of the click bolt from the outer flange member in order to rotationally lock or unlock the bolt. More particularly, according to an embodiment, the click bolt includes a click member that is axially movable relative to the outer flange member to engage or disengage one or more detents that prevent the bolt from rotating relative to the flange. Moreover, in an embodiment, the click member moves alternatingly between axially engaged and disengaged positions corresponding to sequential rotational increments of the click member relative to the bolt body. In an engaged mode, the click bolt cannot rotate with respect to the outer flange, and as a result, the bolt securely holds the flange against the blade without becoming undesirably loosened or overtightened. Advantageously, the bolt can be installed using a low amount of torque without risk that the bolt will become undone, allowing for manual installation of the bolt without tools, and the click bolt can be easily removed by hand when the click member is moved to the disengaged position, axially free from the outer flange.

More specifically, according to the exemplary embodiment illustrated in FIG. 4, the click bolt 150 includes the body 152, a click member 170, a spring 180, and a cap 190. The click member 170 is movably mounted to the body 152. In an embodiment, the click member 170 is generally ring-shaped and has a central opening 172. The central opening 172 receives a cylindrical post 158 that projects from the head 154 in a direction opposite the threaded shank 156. A cavity 174 is defined at an upper side of the click member 170 to receive the spring 180. The illustrated spring 180 is generally circular or washer-shaped, having a generally sinusoidal contour. However, it will be recognized that the spring could be provided in a variety of shapes appropriate to provide biased deflection in an axial direction, such as a coil spring. In order to movably mount the click member 170 to the body 152, the cap 190 is fixed to the post 158 to contain the spring 180 within the cavity 174. In an embodiment, the spring could have a portion in biased contact directly against a portion of the bolt body, and another portion in biased contact against the click member. Alternatively, the spring could be formed integrally with the cap.

When the click bolt 150 is assembled, the spring 180 is positioned between the click member 170 and the cap 190, biasing the click member 170 in an axial direction toward the threaded shank 156. The click member 170 is rotatable and slidable on the post 158. To facilitate adjustment of the click bolt 150 by hand and without tools, the click member 170 has an exterior surface 176 that is shaped with a contour adapted for gripping.

Figure 7:
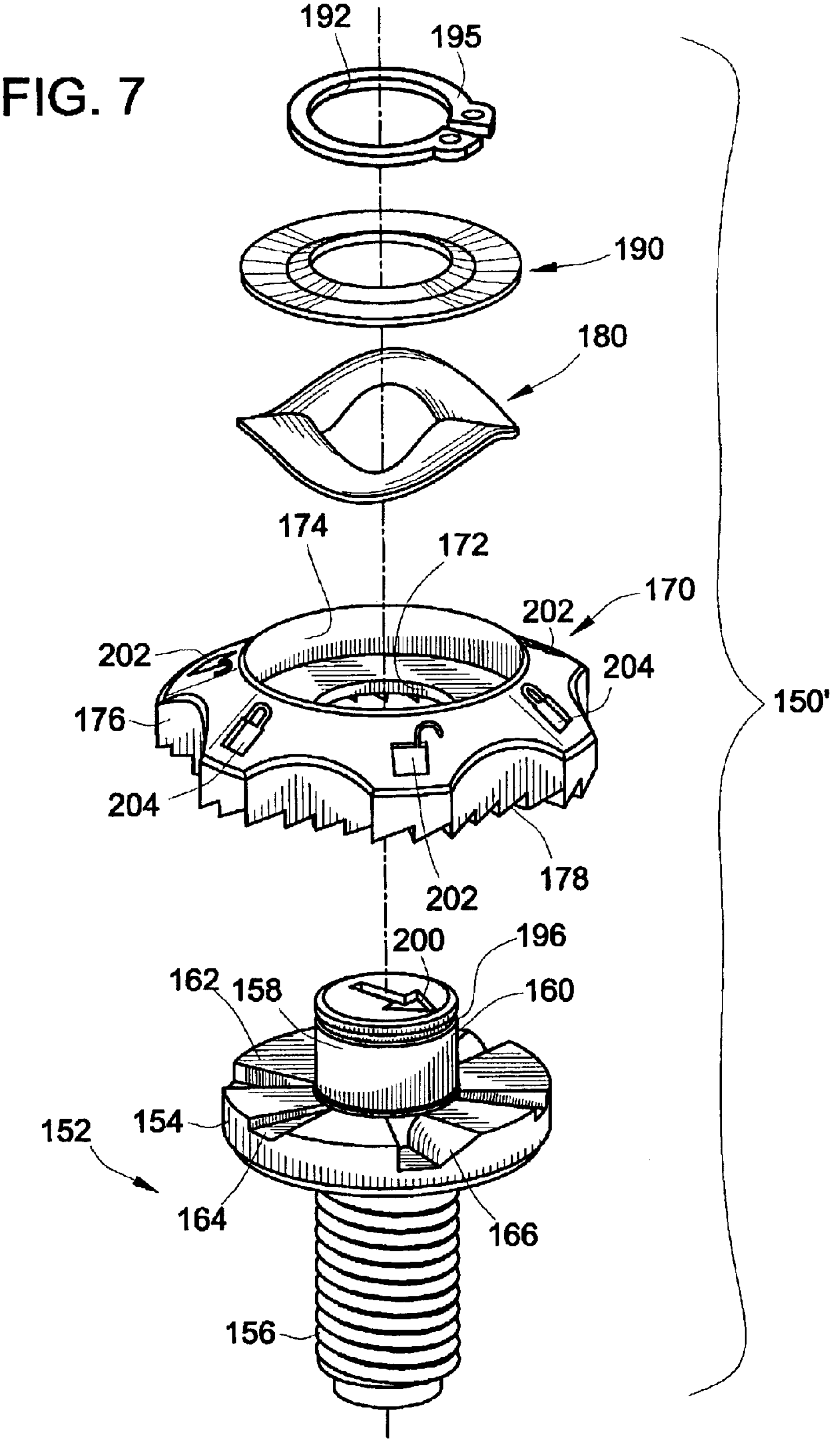
FIG. 7 is a perspective view of a click bolt according to an alternative embodiment that includes a fastener to secure the cap to the post.

The cap 190 is fixed to the post by any appropriate means. For example, in an embodiment, a central cutout 192 of the cap 190 is sized to engage the post 158 with a resistance fit. In an embodiment, the post 158 can include an annular ridge or groove 160 against which the cap 190 seats. Alternatively, an appropriate fastener can be provided to secure cap to the post. As illustrated in FIG. 7, for example, a click bolt 150' includes a C-shaped retainer clip 195 that can be fixed in an annular groove 196 in the post exteriorly of the cap 190, the clip 195 providing an axial holding force against the cap.

Figure 5A:
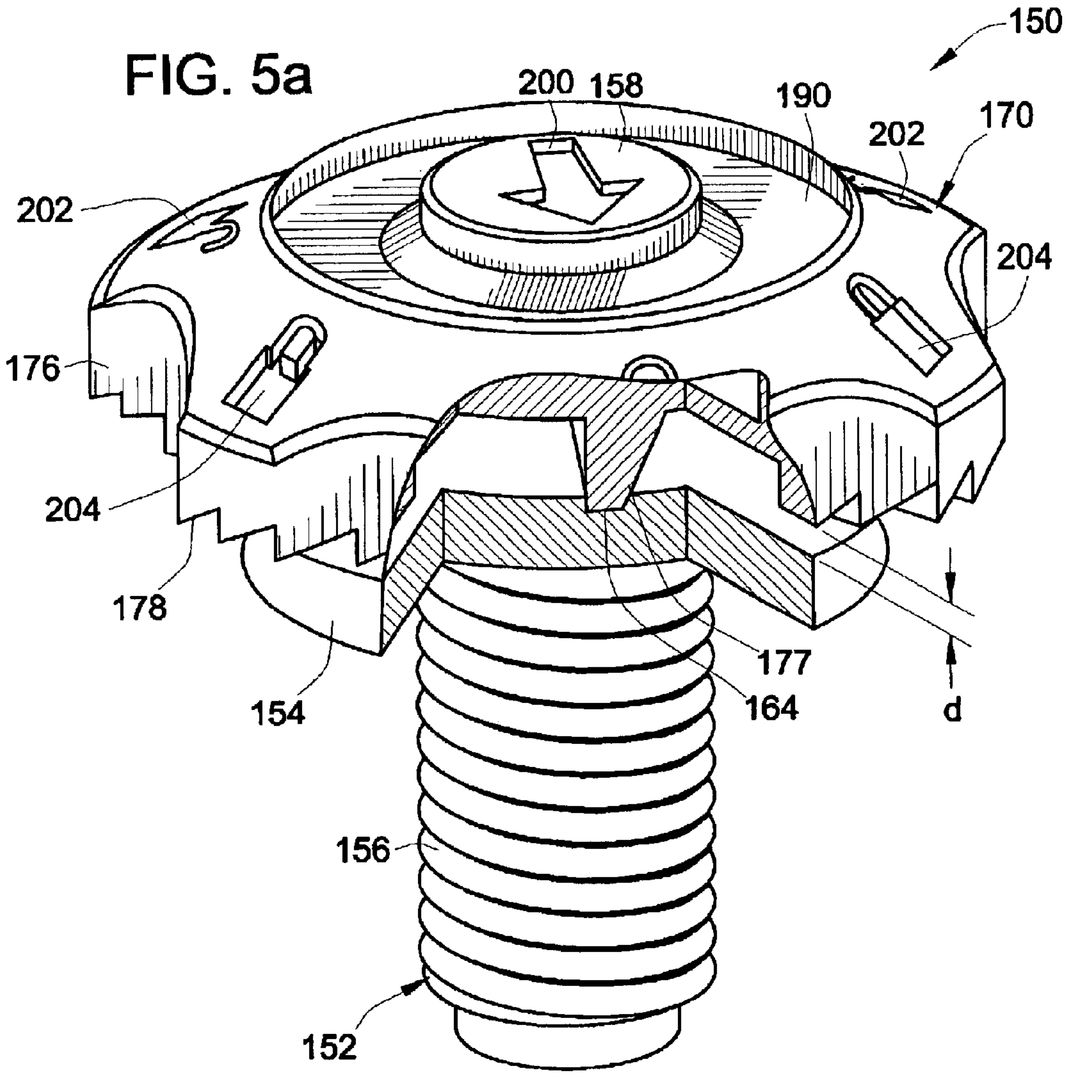
FIG. 5*a* is a perspective view of the click bolt, a portion cut away to illustrate the cam structure holding the click member in the first, axially raised position.
Figure 5B:
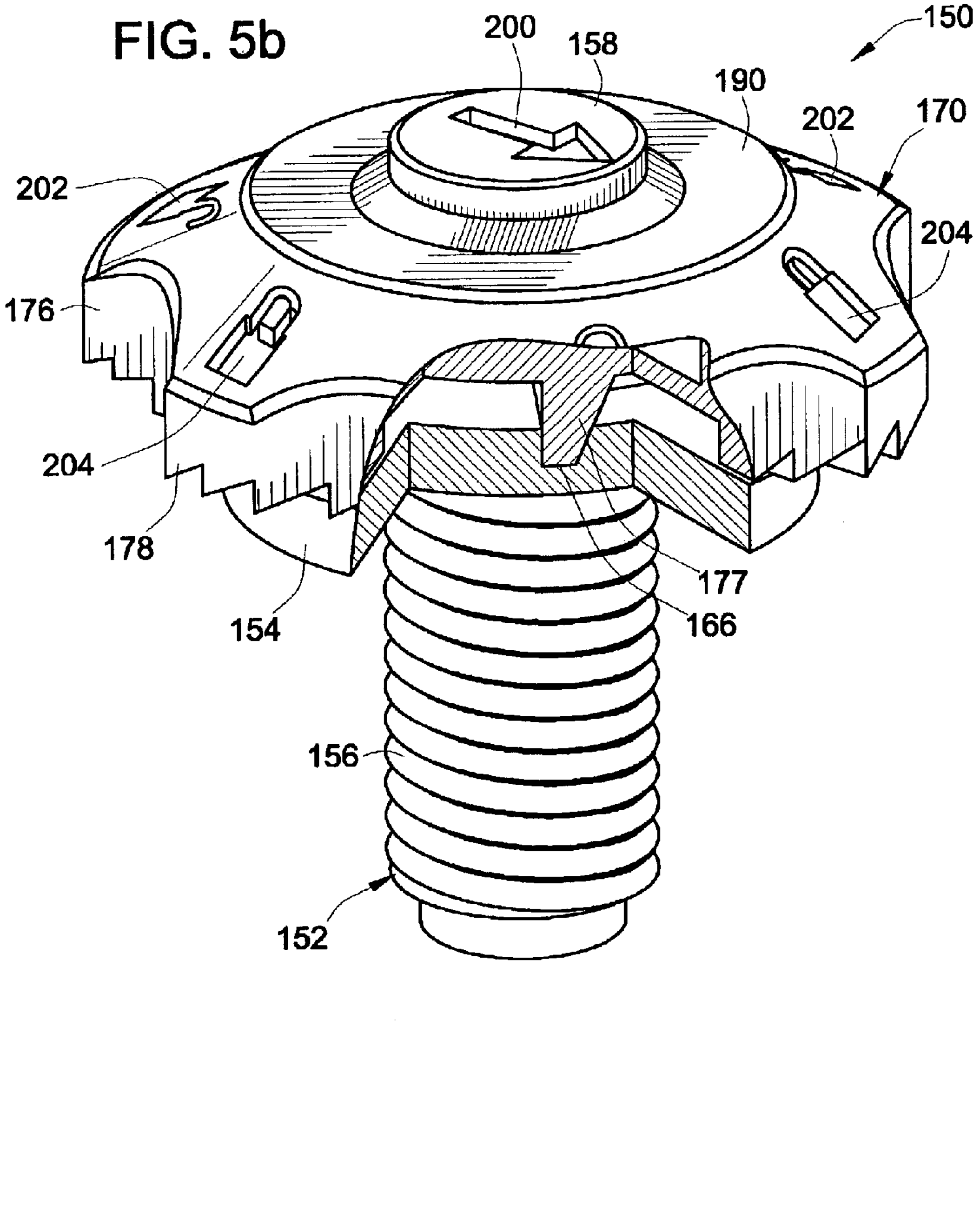
FIG. 5*b* is a perspective view of the click bolt, a portion cut away to illustrate the cam structure holding the click member in a second, axially lowered position.

In order to permit selective locking and unlocking of the click bolt 150 (FIGS. 1–6), 150' (FIG. 7) with respect to the outer flange 120, the click member 170 is movable with respect to the bolt body 152. In the illustrated exemplary embodiment, the click member 170 is slidable along the post 158 in an axial direction, and the click bolt 150 includes a cam structure operable to cause axial motion as a result of rotation of the click member. Referring to FIG. 4, the bolt head 154 includes a generally circular cam surface 162 disposed around the post 158 and which extends radially therefrom. To define predetermined axial positions of the click member, the bolt head 154 includes at least one shallow recess 164 and at least one deep recess 166. To follow in contact against the cam surface 162, the click member 170 includes at least one follower structure such as ramped portion 177, as illustrated in FIGS. 5*a* and 5*b*.

Preferably, the click member 170 includes multiple ramped portions 177, as shown in FIGS. 5*a*, 5*b*, 6*a*, and 6*b*, which are spaced at equal angular increments from each other. The ramped portions 177 project downwardly in an axial direction toward the circular cam surface 162 of the bolt head 154. On the bolt head 154, multiple deep recesses 166 and multiple shallow recesses 164 are provided at appropriate angular spacing so that all of the ramped portions 177 of the click member 170 concurrently fall into either the respective deep recesses 166 or shallow recesses 164 in alternation as the click member 170 is rotated about the post 158. In embodiment, for example, the click member 170 includes three ramped portions spaced about 120° from each other, the cam surface 162 includes three deep recesses 166 spaced about 120° from each other, and the cam surface also includes three shallow recesses 164 spaced about 120° from each other. In such a configuration, the shallow recesses and deep recesses are alternatingly positioned and sequentially spaced apart from each other by about 60°. As a result, the click member 170 is rotatable in increments, arriving at rotational detent positions associated with the respective shallow and deep recesses 164, 166. Of course, the illustrated embodiment is an example only, and the bolt could include any number of recesses and appropriate angular spacing, as desired.

When the click member 170 is positioned so that the ramped portions are positioned between recesses 164, 166, the ramped portions slide on a planar portion of the cam surface 162. In such a condition, the click member 170 is temporarily in a third axial position that is raised even farther than the first axial position. Because the spring 180 urges the click member 170 axially toward the bolt head 154, the ramped portions 177 "click" or drop into the recesses 164 or 166 when the click member 170 has rotated to the next increment. The ramped portions 177 and the recesses 164, 166 are configured so that rotation of the click member 170 relative to the bolt body 152 in a direction of rotation used to install the bolt 150 (e.g., counterclockwise in the illustrated embodiment due to the reverse threads of shank 156) causes the click member to be displaced outwardly, and the straight sides of the ramped portions 177 and the recesses 164, 166 are configured to remain engaged to deliver torque in a direction of rotation used to remove the bolt (e.g., clockwise in the illustrated embodiment).

It will be recognized that the invention is not limited to the example wherein the click member snaps into selected position with a clicking sound. The illustrated embodiment, for example, could be operated without clicking if a user applied a manual lifting force to the click member. Also, embodiments are possible which have a smooth action, are possible. It is preferred, however, to provide the click member with a clicking action as feedback to a user and to provide consistent and repeatable torque to the bolt body.

For resisting rotation and rotationally locking the click bolt 150 relative to the outer flange 120 when the click member 170 is in the second, engaged position (e.g., FIGS. 5*b* and 6*b*), the wrenchless clamp bolt assembly includes a detent structure. For example, referring to FIG. 3, the outer flange 120 includes one or more locking detents 128 that face in an outward direction away from the blade, and the click member 170 includes a plurality of locking detents 178 that face in an inward direction toward the blade. The locking detents 128, 178 are cooperatively shaped to matably engage with each other when the click member 170 is urged in axial contact against the outer flange 120. Engagement of the locking detents 128, 178 prevents rotation of the bolt 150 relative to the outer flange 120 in one direction, and provides a resistance to rotation of the click member 170 in the opposite direction which can be overcome by manual turning.

Figure 6A:
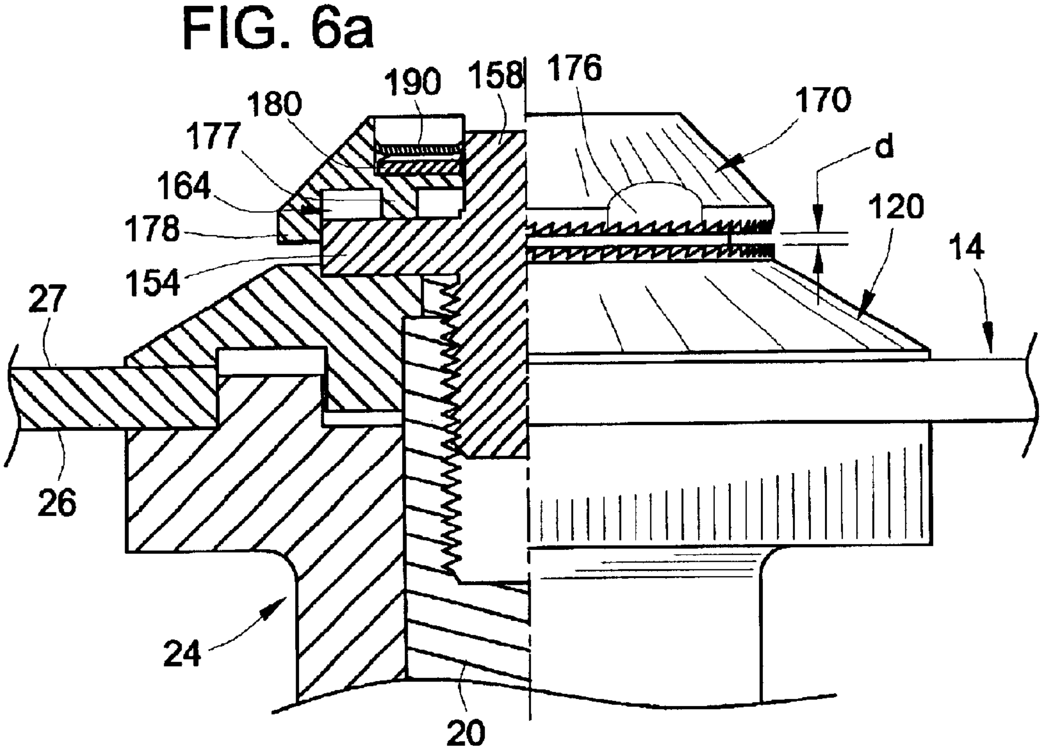
FIG. 6*a* is a side elevation of the blade clamp assembly in a disengaged mode, wherein the click member of the click bolt is in the first axial position, wherein the locking detents of the click portion are raised or axially spaced from locking detents of the outer flange, thereby permitting rotation of the bolt.
Figure 6B:
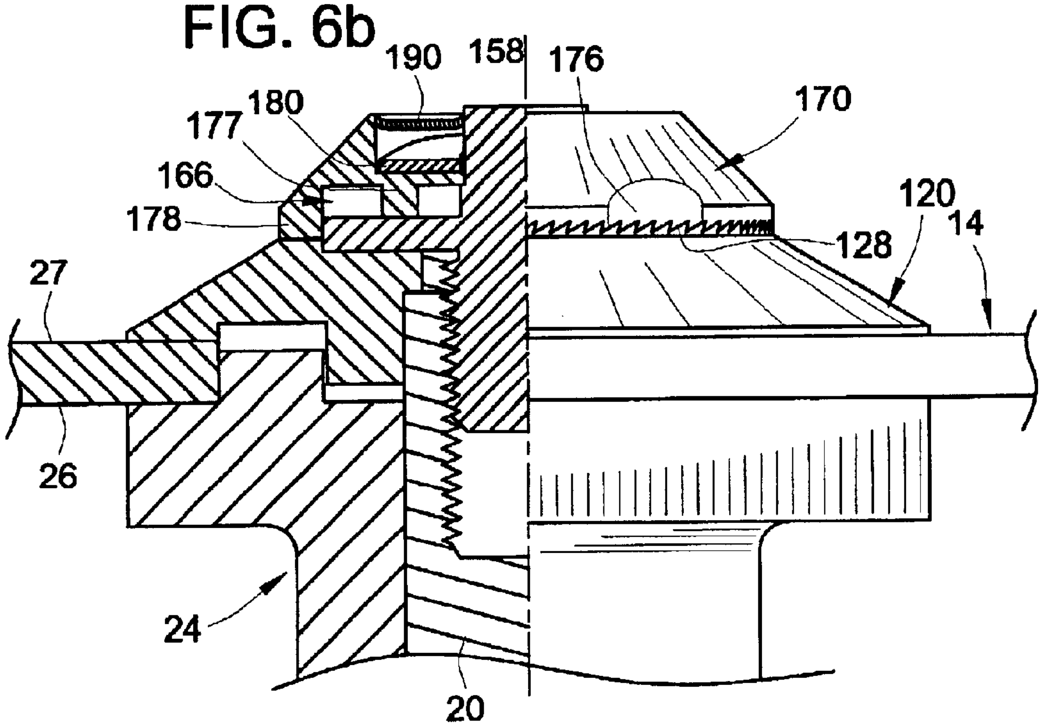
FIG. 6*b* is a side elevation of the blade clamp assembly in an engaged mode, wherein the click member of the click bolt is in the second axial position, the locking detents of the click portion interlockably engaging the locking detents of the outer flange, thereby preventing rotation of the bolt.

In the illustrated embodiment, each of the locking detents 128, 178 has a sloped side. The sloped sides of the locking detents 128, 178 are ramped in the same direction as the ramped portion 177 of the click member 170. As a result, when the click member is rotated in a direction to install the bolt (e.g., counterclockwise in the illustrated embodiment) with enough force to overcome the spring 180, the click member 170 is axially displaced in an outward direction to a disengaged mode (FIG. 6*a*). In addition to the sloped side, each of the locking detents 128, 178 also has side that is configured to provide a stronger resistance to rotation than the sloped side. For example, such a side can be aligned in an orientation that is closer to axial. Of course, variations are possible wherein the side is not exactly axial, so long as the locking detents 128, 178 are configured to remain engaged and to prevent rotation of the bolt in a direction that would unscrew the bolt (e.g., clockwise in the illustrated embodiment) while the click member is in the engaged mode (FIG. 6*b*).

The depths of the respective shallow and deep recesses 164, 166 are designed to allow selective locking or unlocking of the click bolt 150 with respect to the outer flange 120 when the bolt is fully threaded into the bore 22 (FIG. 2). Referring to FIG. 6*a*, when the ramped portion 177 of the click member 170 resides in the shallow recess 164, the click member is in a first axial position at which the locking detents 178 are spaced from the locking detents 128 of the outer flange 120 by gap d. When the click member 170 is in the first position, disengaged from the outer flange 120, the bolt can be rotated in an appropriate direction (clockwise in the case of the illustrated embodiment) for removal from the shaft. Turning to FIG. 6*b*, when the ramped portion 177 of the click member 170 resides in the deep recess 166, the click member 170 is in a second axial position at which the locking detents 178 engage the locking detents 128 of the outer flange 120.

To provide a visual indication of whether the click bolt is in an engaged or disengaged mode, in an embodiment, the click bolt 150 includes indicator 200 on the bolt body 152, and indicators 202 and 204 on the click member 170, as illustrated in FIGS. 4, 5*a*, 5*b*, and 7. For example, the indicator 200 is located on a top of the post 158 and may be shaped as an arrow. Depending on the angular position of the click member 170 relative to the bolt body 152, the arrow shaped indicator 200 may point to either the indicator 202 or 204, representing a corresponding mode of the bolt. More particularly, as illustrated in FIG. 5*a*, the arrow indicator 200 points to the indicator 202, representing an disengaged mode wherein the click member 170 is in the first axial position, and as illustrated in FIG. 5*b*, the arrow indicator 200 points to indicator 204, representing an engaged mode wherein the click member 170 is in the second axial position.

In order to ease use of the wrenchless blade clamp assembly, in an embodiment, the click member 170 is rotatable in a one-way manner. For example, each of the recesses 164, 166 (FIG. 4) of the bolt head 154 preferably includes a straight side that is generally axially oriented, a flat bottom, and a sloped side. Each of the ramped portions 177 also includes a generally straight, axially oriented side, a flat tip, and a sloped side, as illustrated in FIGS. 5*a* and 5*b*. Each of the recesses 164, 166 of the bolt head 154 is shaped to cooperatively receive one of the ramped portions 177, wherein the sloped side of the ramped portion 177 mates against the sloped side of the recess 164, 166 when the respective recess receives a ramped portion. The one-way rotation is preferably in the same direction that the click bolt 150 must be rotated to turn the threaded shank 156 into the threaded bore 22 (FIG. 2).

The wrenchless blade clamp assembly 100 advantageously avoids a need to install the bolt 150 with a high amount of torque. Moreover, the one-way rotation of the click member 170 advantageously prevents the click bolt 150 from being overtightened during installation of the blade on the saw. The click member 170 is preferably in the raised first axial position (FIGS. 5*a*, 6*a*) when the bolt is initially threaded into the threaded bore 22 (FIG. 2). As a user applies torque to click member 170 to screw in the bolt 150, the bolt head 154 eventually seats against outer flange 120 when fully inserted, as illustrated in FIG. 6*a*. At this point, the click member 170 is not yet engaged with the outer flange 120; the locking detents 128, 178 are spaced apart by gap d. The user continues to apply torque to a sufficient magnitude so that the click member 170 "clicks" one rotational increment (wherein the ramped portions 177 are positioned in the deep recesses 166), causing the click member 170 to shift to the second axial position of FIG. 6*b* wherein the locking detents 128, 178 are engaged. As will be recognized by those skilled in the art, the amount of torque that must be overcome in order to incrementally rotate the click member 170 is dependent upon various design factors, such as the compression force of spring 180, the angle of the sloped sides of the ramped portions 177, the angle of the sloped sides of the recesses 164, 166, surface roughness, and the coefficient of friction. These features can be varied to provide a desired amount of rotational resistance needed to "click" the click member to a next incremental rotation, to reach a desired mounting torque. Accordingly, the recesses 164, 166, the ramped portions 177, and the spring 180 provide a ratchet mechanism that permits limited torque in one direction of rotation.

If the click member 170 happens to be in the second position (FIGS. 5*b*, 6*b*) when the bolt 150 is initially being screwed in, the click member 170 automatically moves to the first axial position (FIGS. 5*a*, 6*a*) as a user manually rotates the bolt. More specifically, the ramped sides of the detents 128, 178 interact before the bolt head 154 becomes fully seated, causing the click member 170 to shift to the raised first axial position as continued torque is applied, thereby permitting the bolt 150 to be threaded until the bolt head 154 is seated (FIG. 6*a*). As described above, the user continues to turn the click member 170 until it rotates another increment and shifts to the second position, wherein the detents 128, 178 are engaged (FIG. 6*b*).

During use of the saw, the wrenchless blade clamp assembly 100 remains in the second axial position (FIG. 6*b*). The bolt 150 holds the outer flange 120 in secure contact against the outer side 27 of the blade 14, thereby holding the blade fixed against the inner flange 24. The engagement of the locking detents 128, 178 keeps the bolt 150 from inadvertently rotating.

To remove the blade from the circular saw, the user again grips and rotates the click member 170 in the same direction as turned for installation (counterclockwise in the illustrated embodiment). This causes the click member 170 to "click" or move to a next rotational increment, moving the click member 170 from the second axial position (FIG. 6*b*) to the first axial position (FIG. 6*a*). When in first axial position, as illustrated in FIG. 6*a*, the click member 170 is free from the outer flange, and the disengaged locking detents are separated by gap d. At this point, the user can grip the click member 170 and rotate the bolt 150 in a removal direction (clockwise in the illustrated embodiment) so that the threaded shaft 156 travels axially outwardly of the threaded bore. When turning the click member 170 in the removal direction, force is transmitted from the click member to the bolt head 154 via contact between the straight, axially directed sides of the ramped portions 177 and the shallow recesses 164. Force between the straight sides, in contrast to the sloped sides, does not result in axial displacement of the click member 170. Therefore, the user can remove the bolt 150 by gripping and applying a turning force to the click member 170. In connection with the illustrated embodiment, it will be understood that some variation in shape and/or orientation is permitted with respect to the sides of the ramped portions 177. For example, the sides described herein as straight and axially oriented may not necessarily be strictly straight or axially oriented.

Figure 8A:
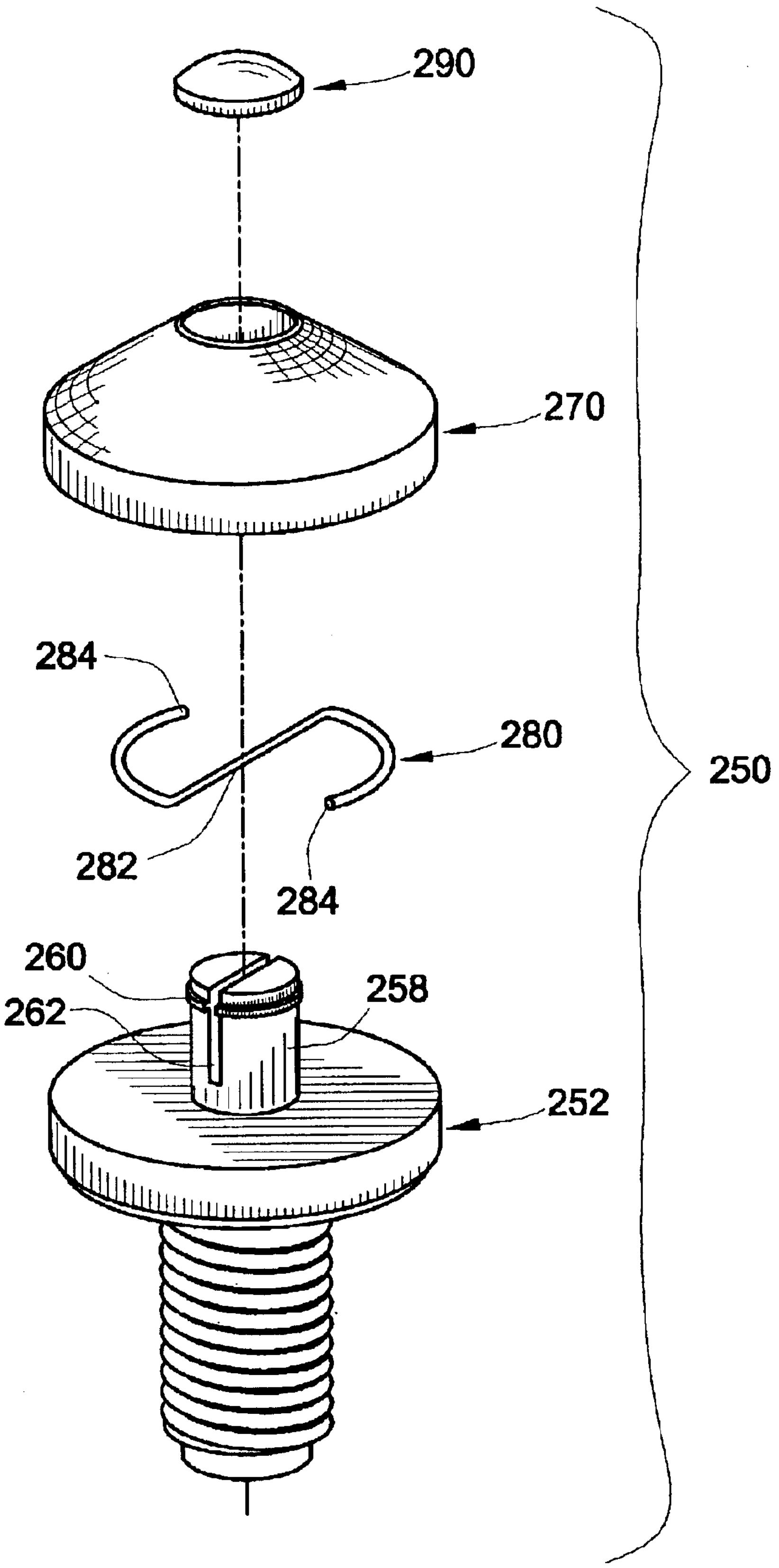
FIG. 8*a* is a perspective view of a click bolt according to an alternative embodiment that limits torque applied during installation of the click bolt.
Figure 8B:
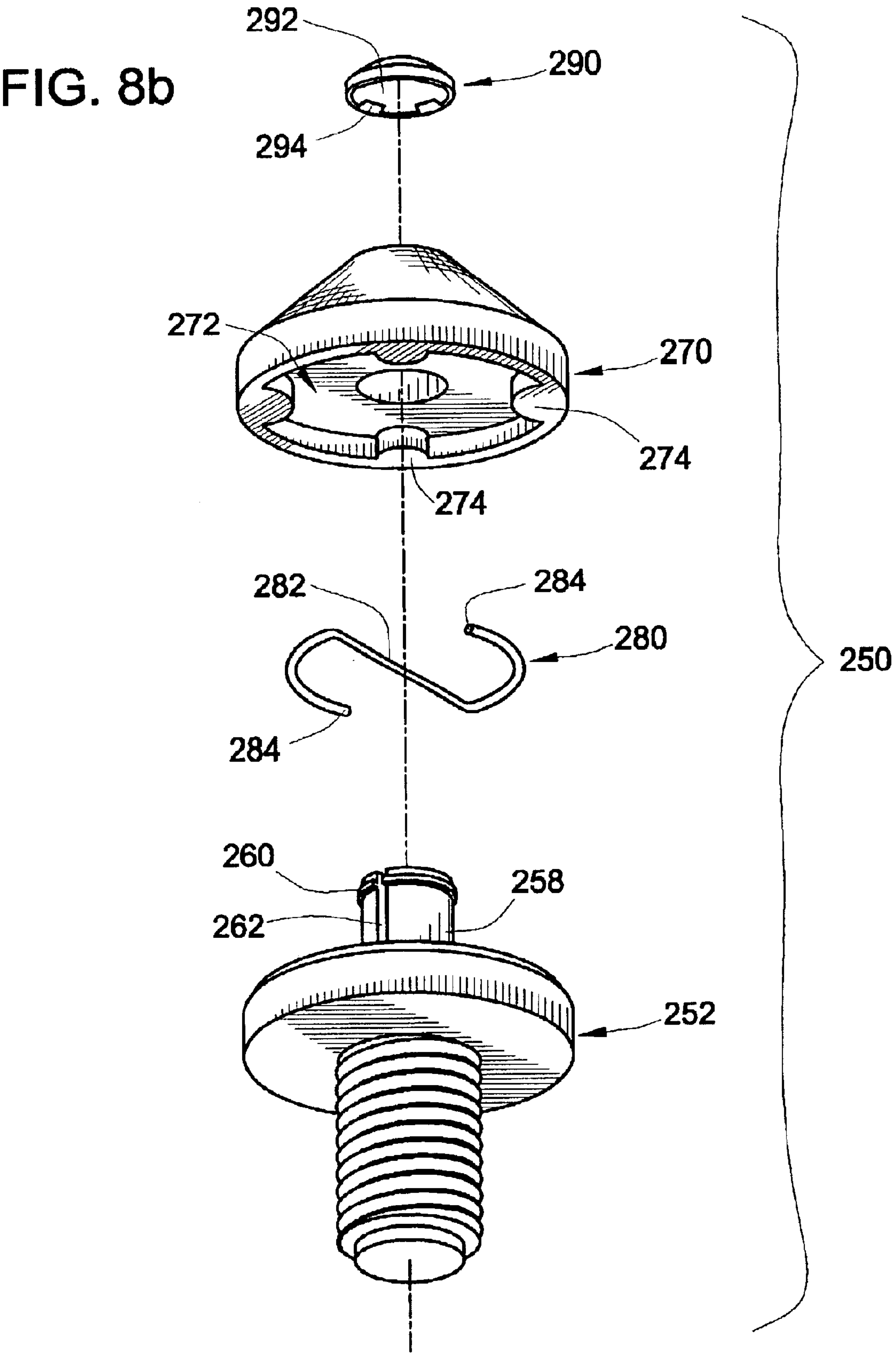
FIG. 8*b* is a lower perspective view of the click bolt of FIG. 8*a*.

In FIGS. 8*a* and 8*b*, a click bolt 250 having a bolt body 252, a click member 270, a pawl 280, and a cap 290 is illustrated. Like the embodiment described in connection with FIGS. 1–7, the bolt body 252 has a threaded shank to be screwed into a shaft of a power tool to secure a tool disc, such as a circular saw blade. The click bolt 250 may be installed against an outer flange that has no locking detents.

The click bolt 250 includes a ratchet mechanism that prevents overtightening. Generally, the pawl 280 is mounted to the bolt body 252, and has portions that resiliently contact against the click member 270. Referring to FIG. 8*b*, for example, the pawl 280 has at least one tip 284 that is deflected when a tooth 274 slides over the pawl 280 when the click member 270 is manually rotated relative to the bolt body 252 beyond a predetermined torque in a rotational direction that would cause the threads to penetrate deeper into the shaft. Additionally, when the click member 270 is manually turned in a direction to remove the bolt 250 from the shaft, the pawl 280 rigidly engages the tooth 274, preventing relative rotation of the click member 270 relative to the bolt body 252. Alternatively, in an embodiment not illustrated, the pawl could be mounted to the click member to act against at least one tooth on the bolt body.

In the exemplary embodiment of FIGS. 8*a* and 8*b*, the bolt body 252 has a head, a threaded shank projecting from the head, and a post 258 projecting from the head opposite the shank. The pawl 280 is shown as a resilient S-shaped spring having a center segment 282 and a pair of tips 284 defined by opposite ends. The center segment 282 fits securely within a slot 262 in the post 258. The click member 270 is rotatably mounted to the post 258. As illustrated in FIG. 8*b*, the click member 270 includes an aperture through which the post extends, thereby receiving the pawl 280 within an interior cavity 272 defined in an underside of the click member. The click member also includes one or more teeth 274 positioned within the interior cavity 272.

Still referring to FIG. 8*b*, to permit limited torque during installation, the pawl 280 is deflected so that the tips 284 are biased outwardly in a radial direction against the sides of the interior cavity 272. In one direction, rotation of the click member 270 relative to the bolt body 252 causes the tooth to pass over the pawl, when the torque exceeds predetermined amount. Those skilled in the art will recognize that the amount of torque will vary depending on the stiffness of the pawl 280, the dimensions of the pawl 280, surface roughness of the spring and the surface of the click member 270 within the interior cavity 272, and the coefficient of friction.

The click member 270 is held in position by a cap 290. The cap 290 is secured to a top of the post 258, permitting the click member 270 to be rotated with respect to the bolt body 252, as appropriate yet holding the components of the click bolt 250 together. With reference to FIG. 8*b*, the cap 290 includes a hole 292, with a plurality of tabs 294 projecting inwardly around the hole 292. The cap 290 is pressed downwardly onto the post 258, the tabs 294 receiving the post 258 within the hole 292 with a resistance fit. In an embodiment, the post 258 includes a ridge 260 over which the tabs 294 securely fit. The cap 290 prevents the click member 270 from sliding off of the post 258 in an axial direction.

It should be understood that the illustrated embodiments are exemplary only, and should not be taken as limiting the scope of the present invention. Structural components of the present invention may have a variety of configurations and shapes. For example, the cam structure could be configured so that the cam surface and recesses are formed in the click member, and the projections extend from the bolt to follow the cam surface, and/or the locking detents could have a variety of shapes that prevent rotation when engaged. The click bolt could be configured in various ways to include a movable component to permit selective locking engagement with the outer flange. Also, the click bolt and clamp assembly are not limited to use for securing a circular saw blade. The clamp assembly could be used for mounting other types of tool discs to a rotational shaft of a power tool.

What is claimed is:

1. A wrenchless clamp assembly for securing a tool disc to a rotatable shaft of a power tool, wherein the rotatable shaft has an axially oriented threaded bore, the clamp assembly comprising:

an outer flange positionable against an outer side of the tool disc, the outer flange having a central aperture;

a bolt including:

a bolt body including a head and a shank that projects in an axial direction from the head, the shank having external threads that are matably receivable in the threaded bore in the shaft, the shank configured to extend through the aperture of the outer flange, such that the bolt head can axially seat against the outer flange; and a click member mounted to the bolt head, the click member being axially movable relative to the bolt head between a first axial position in which the click member is free from the outer flange and a second axial position in which the click member is engaged with the outer flange to resist rotation relative thereto.

2. The clamp assembly of claim 1, wherein the click member is rotatably mounted to the bolt body, the bolt including a cam structure operable such that rotation of the click member results in selective axial motion between the first axial position and the second axial position.

3. The clamp assembly of claim 2, wherein the cam structure causes the click member to move to a third axial position when the click member is rotated such that the click member is intermediately between the first and second axial positions.

4. The clamp assembly of claim 2, the bolt head including a generally circular cam surface having at least one recess, the click member having at least one ramped portion that contacts and follows the cam surface.

5. The clamp assembly of claim 4, including at least one recess having a depth such that the click member is in the first axial position when the ramped portion is in the recess.

6. The clamp assembly of claim 4, including at least one recess having a depth such that the click member is in the second axial position when the ramped portion is in the recess.

7. The clamp assembly of claim 4, the cam surface including at least one shallow recess having a depth such that the click member is in the first axial position when the ramped portion is in the shallow recess and at least one deep recess having a depth such that the click member is in the second axial position when the ramped portion is in the dew recess.

8. The clamp assembly of claim 7, wherein multiple shallow recesses and multiple deep recesses are positioned in alternating angular positions on the cam surface.

9. The clamp assembly of claim 2, wherein the threads of the shank are oriented so that the shank must be screwed into the bore in a rotational direction that is opposite an operational rotational direction of the shaft.

10. The clamp assembly of claim 2, wherein the click member is rotatable relative to the bolt body in a one-way manner.

11. The clamp assembly of claim 2, wherein the bolt further includes an indicator fixed relative to the bolt body and at least one indicator representing that the click member is in the first click position when the indicator is aligned with the indicator on the bolt body.

12. The clamp assembly of claim 2, wherein the bolt further includes an indicator fixed relative to the bolt body and at least one indicator representing that the click member is in the second click position when the indicator is aligned with the indicator on the bolt body.

13. The clamp assembly of claim 1, wherein the bolt further includes a biasing member that urges the click member toward the outer flange.

14. The clamp assembly of claim 1, wherein the bolt body also has a post that projects from the bolt head in an axial direction opposite the threaded shank, and wherein the click member has a central opening that fits over the post so that the click member rotates relative to the post.

15. The clamp assembly of claim 14, wherein the bolt further includes:

a cap mounted to the post; and a spring disposed between the cap and the click member to bias the click member away from the cap.

16. The clamp assembly of claim 15, wherein the click member includes a cavity shaped to receive the spring, the cap containing the spring within the cavity.

17. The clamp assembly of claim 15, wherein the spring is generally ring shaped, having a generally sinusoidal contour.

18. The clamp assembly of claim 15, wherein the cap is mounted to the post by a resistance fit.

19. The clamp assembly of claim 15, wherein the cap is mounted to the post by a fastener secured to the post at an external side of the cap, opposite the spring.

20. The clamp assembly of claim 1, wherein the outer flange includes at least one locking detent and the click member includes at least one locking detent, the locking detents of the outer flange and click member being cooperatively shaped.

21. The clamp assembly of claim 20, wherein each of the locking detents has a sloped side and another side that is generally more axially oriented than the sloped side, wherein respective sloped sides of the locking detents of the click member and outer flange meet in a flush manner when the click member engages the outer flange.

22. The clamp assembly of claim 21, wherein the sloped sides have an orientation effective to axially displace the click member in an outward direction when the click member is rotated with respect to the outer flange in a rotational direction associated with installing the bolt shank.

23. The clamp assembly of claim 1, wherein the power tool is a circular saw and wherein the tool disc is a circular saw blade.

24. A wrenchless clamp assembly for mounting a tool disc to a shaft of a power tool, the blade clamp assembly comprising:

an outer flange positionable against an outer side of the tool disc; and a bolt including:

a bolt body having a shank that is threadable to the shaft; and means for selectively locking and unlocking the bolt body in a rotational direction relative to the outer flange.

25. The clamp assembly of claim 24, wherein the means for selectively locking and unlocking includes a click member mounted to the bolt body, and means for axially moving the click member relative to the bolt body between a first axial position in which the click member is free from the outer flange and a second axial position in which the click member is engaged with the outer flange and rotationally locked thereto.

26. The clamp assembly of claim 25, wherein the means for axially moving is effective to cause axial movement as a result of rotation of the click member relative to the bolt body.

27. The clamp assembly of claim 26, wherein the means for axially moving is effective to axially move the click member between the first and second axially positions in alternation corresponding to rotational increments of the click member relative to the bolt body.

28. The clamp assembly of claim 26, further comprising means for urging the click member toward the outer flange.

29. A wrenchless clamp assembly for mounting a tool disc to a shalt of a power tool, the shaft including a threaded bore, the clamp assembly comprising:

a bolt body having a shank that is threadable to the shaft;

a click member that is rotatably mounted to the bolt body and which includes an interior cavity in which at least one tooth is located; and a resilient spring having a center segment, which is secured to the bolt body, and a pair of tips at opposite ends, wherein the spring deflects so that each of the tips is biased in a radial direction outwardly against the interior cavity of the click member towards the at least one tooth, thereby yielding to the tooth when the torque exeeds a predetermined amount and permitting limited torque between the click member and the bolt body in at least one direction of rotation.

30. The wrenchless clamp assembly of claim 29, wherein the spring permits the click member to rotate relative to the bolt body when turned beyond a predetermined torque in the direction of rotation, thereby causing the threads to penetrate deeper into the threaded bore of the shaft.

31. The wrenchless clamp assembly of claim 30, wherein the direction in which the click member rotates relative to the bolt body is opposite to the direction in which the shaft of the power tool rotates when in operation.

32. The wrenchless clamp assembly of claim 30, wherein the spring prevents rotation of the click member relative to the bolt body when turned in a direction to cause the threads to remove from the shaft.

33. The wrenchless clamp assembly of claim 29, wherein the spring is generally S-shaped.

34. A wrenchless clamp assembly for mounting a tool disc to a shaft of a power tool, the blade clamp assembly comprising:

a bolt body having a shank that is threadable to the shaft;

a click member that is rotatably mounted to the bolt body; and a ratchet mechanism that permits limited torque between the click member and the bolt body in at least one direction of relative rotation, wherein the ratchet mechanism includes a generally circular cam surface defined by the bolt body, the cam surface having at least one recess, at least one ramped portion extending from the click member, the ramped portion positioned to contact and follow the cam surface; and a biasing member that urges the ramped portion toward the cam surface.

35. The wrenchless clamp assembly of claim 34, wherein the ratchet mechanism permits the click member to rotate relative to the bolt body when turned beyond a predetermined torque in a rotational direction to cause the threads penetrate deeper into the shaft.

36. The wrenchless clamp assembly of claim 35, wherein the rotational direction is opposite an operational rotational direction of the shaft.

37. The wrenchless clamp assembly of claim 34, wherein the ratchet mechanism prevents rotation of the click member relative to the bolt body when turned in a direction to cause the threads to remove from the shaft.

38. The wrenchless clamp assembly of claim 34, wherein the ratchet mechanism includes:

a generally circular cam surface defined by the bolt body, the cam surface having at least one recess;

at least one ramped portion extending from the click member, the ramped portion positioned to contact and follow the cam surface; and a biasing member that urges the ramped portion toward the cam surface.

39. A wrenchless clamp assembly for mounting a tool disc to a shaft of a power tool, the blade clamp assembly comprising: a bolt body having a shank that is threadable to the shaft; a click member that is rotatably mounted to the bolt body; and a ratchet mechanism that permits limited torque between the click member and the bolt body in at least one direction of relative rotation, wherein the ratchet mechanism includes:

a pawl mounted to the bolt body;

at least one tooth on the click member, the pawl being biased toward the tooth so that the pawl yields to the tooth when the torque exceeds the predetermined amount.

40. The wrenchless clamp assembly 39, wherein the pawl is a resilient spring.

41. The wrenchless clamp assembly of claim 40, wherein the spring is generally S-shaped and has a center segment and a pair of tips at opposite ends, the center segment of the spring being secured to the bolt body, the spring deflecting so that each of the tips is biased in a outwardly against the click member.

42. The wrenchless clamp assembly of claim 41, wherein the click member has an interior cavity, the tooth being positioned in the interior cavity.

* * * * *